United States Patent [19]
Choi et al.

[11] Patent Number: 6,017,635
[45] Date of Patent: Jan. 25, 2000

[54] HYDROPHOBIC COMPOSITION AND A METHOD OF PREPARING A HYDROPHOBIC PLATE

[75] Inventors: Susuk Choi; Sungyoung Lyu, both of Chungchoungnam-do; Jaehou Nah, Seoul; Youngbae Shon, Seoul; Jinsoo Kim, Seoul; Woohyeun Huang, Kyungki-do; Byounghyun Kang, Chungchoungnam-do, all of Rep. of Korea

[73] Assignee: Samsung Display Services Co., Ltd., Rep. of Korea

[21] Appl. No.: 08/911,640

[22] Filed: Aug. 15, 1997

[30] Foreign Application Priority Data

Dec. 24, 1996 [KR] Rep. of Korea ................ 96-70923

[51] Int. Cl.7 ................................................ B32B 15/08
[52] U.S. Cl. ................... 428/422; 427/115; 427/421; 427/435; 428/461; 429/128; 429/209; 524/186; 524/545; 524/546; 524/805

[58] Field of Search ................................. 524/545, 546, 524/186, 805; 428/422, 461; 427/115, 421, 435; 429/128, 209

[56] References Cited

U.S. PATENT DOCUMENTS

| 4,493,917 | 1/1985 | Bailleux et al. | 524/394 |
|---|---|---|---|
| 4,555,556 | 11/1985 | Beresniewicz | 524/714 |
| 5,168,107 | 12/1992 | Tannenbaum | 524/514 |
| 5,276,261 | 1/1994 | Mayer et al. | 524/546 |
| 5,364,929 | 11/1994 | Dee et al. | 524/463 |
| 5,508,330 | 4/1996 | Coughlin et al. | 524/251 |

*Primary Examiner*—John M. Cooney, Jr.
*Attorney, Agent, or Firm*—Christie, Parker & Hale, LLP

[57] ABSTRACT

The hydrophobic composition prepared by dissolving a hydrophobic resin in a perfluorocarbon solvent, can be very thinly and uniformly coated on a plate. Therefore, when a cell is prepared by using the coated plate, internal pressure of the cell can be decreased.

20 Claims, 1 Drawing Sheet

HYDROPHOBIC COMPOSITION AND A METHOD OF PREPARING A HYDROPHOBIC PLATE

This application claims priority of Korean patent application No. 96-70923, filed Dec. 24, 1996.

BACKGROUND OF THE INVENTION (a) Field of the Invention

The present invention relates to a hydrophobic composition and a method of preparing a hydrophobic plate, and specifically, to a hydrophobic composition having good hydrophobic property which can give a good hydrophobic property to a plate though a small amount of hydrophobic resin is used and a method of preparing a hydrophobic plate using the composition.

(b) Description of the Related Arts

In general, a sealed nickel-hydrogen cell, that is an alkali storage battery uses metal oxide as an cathode and hydrogenated alloy as a anode. This cell is charged or discharged by storing the hydrogenated alloy with hydrogen ions produced by decomposing water in the electrolyte during the charging process, and releasing hydrogen ions into the electrolyte during the discharging process.

The nickel-hydrogen cell uses hydrogenated alloy as a negative active material, $Ni(OH)_2$ as a positive active material, and aqueous alkali solution as an electrolyte. The nickel-hydrogen cell can be represented by a general formula of a Ni—MH (nickel-metalhydride) cell. Electrochemical reactions of the nickel-hydrogen cell are represented by the chemical equations:

Cathode: $Ni(OH)_2 + OH^- \leftrightarrows NiOOH + H_2O$ (1)

Anode: $M + H_2O + e^- \leftrightarrows MH + OH^-$ (2)

wherein, M is a hydrogenated alloy that can absorb and release hydrogen ions

A charge-discharge cycle is performed according to the above chemical reaction. When the cathode is overcharged, oxygen gas is electro-chemically generated in the cathode, and when the anode is overcharged, hydrogen gas is electro-chemically generated in the anode. When the charge-discharge cycle is continuously performed under the above condition, the gases generated cause the anode to oxidize and the internal pressure of a cell to rapidly increase thereby decreasing the lifetime and the capacity of the cell. Accordingly, hydrogen and oxygen gas generated should be removed in the cell. In this regard, the anode acts to remove hydrogen and oxygen gas. The chemical reaction for removal of gas is represented by the following equation:

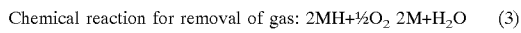

Chemical reaction for removal of gas: $2MH + \frac{1}{2}O_2 \; 2M + H_2O$ (3)

The anode in a nickel-based cell absorbs and then decomposes oxygen and hydrogen gas, thereby decreasing the internal pressure of the cell. Accordingly, it makes to facilitate oxygen decomposition in the anode. Methods of facilitating oxygen decomposition are as follows: adding a catalyst for reducing oxygen; increasing a surface area to be reacted by etching an alloy; or treating a anode plate with hydrophobic material. Among the above methods, the method which can increase the interface of the anode, at which the cleavage or absorption of gas has occurred, by treating the anode with a hydrophobic material in order to give a hydrophobic property to the anode, is widely used.

When the anode is treated with a hydrophobic material according to the above method, it has an advantage that the internal pressure of a cell is decreased, however, a disadvantage is caused that the internal resistance of the cell is increased because the hydrophobic material is a nonconductor. Furthermore, when the plate is too densely coated and the thickness of the coated plate is too thick, it is difficult to react a gas that reached the anode with the anode. In addition, when the surface is not uniformly coated over the anode, cell reaction does not uniformly occur in the anode, thereby deteriorating the performance of the cell. Accordingly, in the method wherein a anode is treated with a hydrophobic material to decrease the internal pressure of the cell, it is preferable to use a material having a good hydrophobic property as a hydrophobic agent. Further, it is important to uniformly and thinly coat fluoro-based resin having a hydrophobic property on the surface of the anode.

At present, in order to give a hydrophobic property to a plate, a method is employed wherein fluoro-based resin powder as a hydrophobic material is dispersed in an organic solvent such as alcohol, or aqueous solution, and then the dispersion obtained is sprayed on a plate.

According to this method, when fluoro-based resin powder is sprayed on the plate, a three-phase (vapor-liquid-solid) interface is formed on the surface of the plate so that gas readily attaches on the plate, and it thus provides the advantage of absorbing or decomposing gas on the plate to decrease the internal pressure.

However, the disadvantages of the spray method is that it is difficult to uniformly coat the dispersion of the fluoro-based resin on the plate, and an excess amount of the resin can be partly coated on the plate. Therefore, conductivity of the plate is lowered and it is difficult to form a pore. Moreover, in case of using alcohol as a solvent, alcohol vaporizes to produce an alcoholic vapor which is harmful to humans and is extremely flammable in mass production. Furthermore, the spray method has problems when the hole of the spray nozzle clogs up with the resin of the spray solution, thereby decreasing the operation efficiency. In addition, when hydrophobic resin is not uniformly coated, cell reaction can not be uniformly performed over a anode plate by continuing a charge-discharge cycle, so that the performance of cell is deteriorated.

In order to solve problems as described above, recently a method is employed wherein a plate is dipped into a fluoro-based resin dispersion to give a hydrophobic property to the surface of the plate.

However, the method of dipping the plate into a fluoro-based resin dispersion has problems of involving a complicated process which comprises the steps of dipping the plate into a hydrophobic resin, drying and calendering using a roller.

The conventional methods of giving a hydrophobic property to a plate as described above, have problems as the following: the effect obtained by giving a hydrophobic property to the plate, is not sufficient because the methods give a hydrophobic property to only the surface of the anode. Furthermore, electrolyte does not smoothly move from the cathode to the anode by continuing a change-discharge cycle, and electrolyte in the anode is exhausted, thereby decreasing the capacity of the cell. Moreover, unevenness on the surface of the anode and stains are occurred by the surface tension of the solution in drying.

SUMMARY OF THE INVENTION

In order to solve the problems of the conventional method as described above, an object of this invention is to provide a hydrophobic composition which can uniformly give a hydrophobic property to a plate though a small amount of hydrophobic resin is used because the resin has a good dispersion property.

Another object of the present invention is to provide a hydrophobic composition which poses no threat of causing a fire, has a high operation efficiency, is not harmful to humans, and can be uniformly coated on the plate.

Further the present invention is to provide a hydrophobic composition which can increase the lifetime of cell by decreasing the internal pressure of a cell when the plate with an increased hydrophobic property by using this composition, is used as a cell plate.

Still another object of the present invention is to provide a method of preparing a hydrophobic plate which has a hydrophobic property by using this composition.

In order to achieve the objects, the present invention provides a hydrophobic composition comprising a hydrophobic resin and, perfluorocarbon or perhalogenated hydrocarbon solvent.

Further, the present invention provides a method of preparing a hydrophobic plate, comprising the steps of coating a plate with the hydrophobic composition comprised of hydrophobic resin and perhalogenated hydrocarbon solvent.

In the present invention, the preferred perfluorocarbon perhalogenated hydrocarbon solvent is selected from a group consisting of $C_3F_8$, $C_4F_{10}$, $C_5F_{12}$, $C_5F_{11}NO$, $C_6F_{14}$, $C_7F_{16}$, $C_8F_{18}$, $CCl_3F$, $CCl_2F_2$, $C_2F_3Cl_3$, $C_2Cl_3F_3$ and $C_2ClF_5$, more preferably, $C_6F_{14}$, $C_7F_{16}$ and $C_8F_{18}$.

Further, the hydrophobic resin is presently preferred to use amorphous fluoro-based resin comprised of a copolymer of tetrafluoroethylene and hexafluoropropylene and/or polytetrafluoroethylene of 0.01 to 5 wt % based on a perfluorocarbon solution. Moreover, a surface energy of the hydrophobic resin is preferably 10 to 20 dyne/cm.

In the present invention, it is preferred that the step of coating the hydrophobic composition is carried out by dipping the plate into the hydrophobic composition or spraying the hydrophobic composition on the plate.

It is presently preferred that the step of coating is maintained until $0.005 < x < 0.8$ mg/cm$^2$ amount of the composition is coated on the plate.

Additional objects, advantages and novel features of the invention will be set forth in part in the description which follows, and in part will become apparent to those skilled in the art upon examination of the following or may be learned by practice of the invention. The object and advantages of the invention may be realized and attained by means of the instrumentality and combination particular pointed out in the appended claims.

Figure 1:
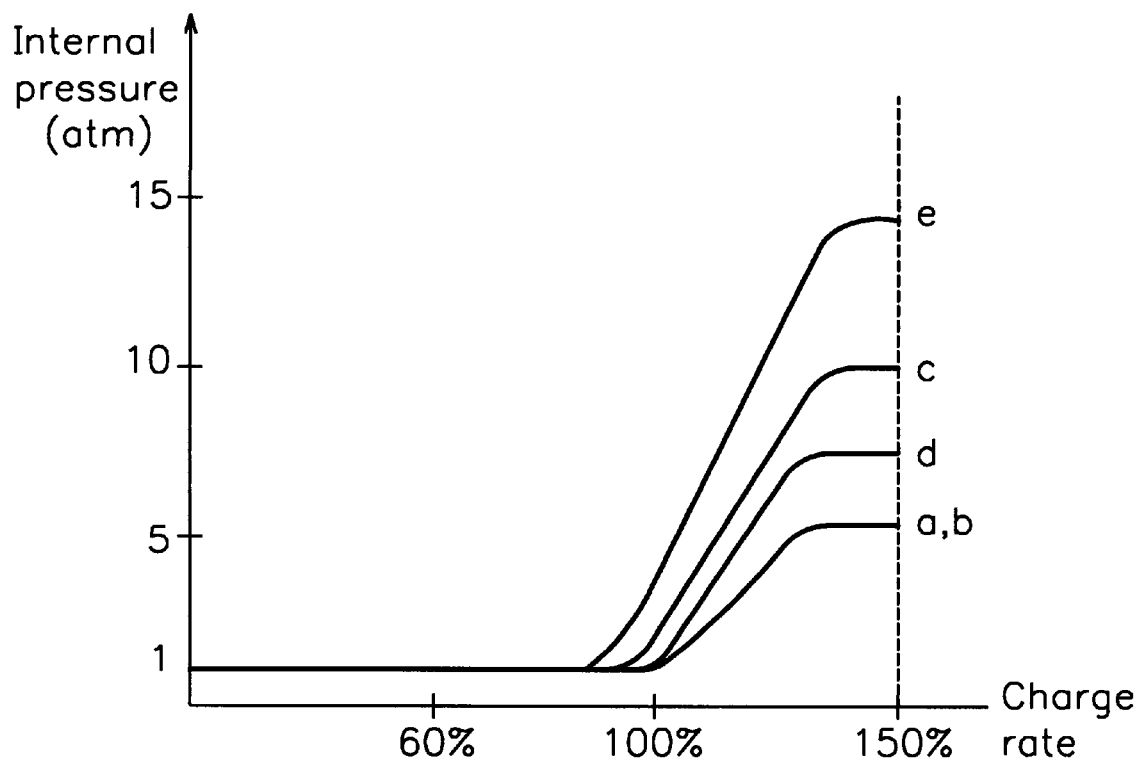
FIG. 1 shows graphs of internal pressure according to charge rate of a cell prepared by examples and comparative examples using a composition for an anode of a nickel-hydrogen cell.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawing and description are to be regarded as illustrative in nature, and not as restrictive.

DETAILED DESCRIPTION OF THE PREFERRED EMBODIMENTS

The present invention is further explained in more details with reference to the following example which is within the scope of this invention.

EXAMPLE 1

5 g of a copolymer of tetrafluoroethylene and hexafluoropropylene was dispersed in 100 g of $C_6F_{14}$ solvent to prepare a hydrophobic composition. The plate is dipped into the hydrophobic composition until 0.5 mg/cm$^2$ of the hydrophobic composition is coated on a plate and thereby preparing a hydrophobic plate.

EXAMPLE 2

10 g of an amorphous fluoro-based resin solution (2 wt %) (FC722 by 3M Co., Ltd.) was dispersed in 90 g of $C_6F_{14}$ solvent to prepare a hydrophobic composition. The plate was dipped into the hydrophobic composition for 5 minutes until 0.04 mg/cm$^2$ of the hydrophobic composition is coated on the plate and thereby preparing a hydrophobic plate.

EXAMPLE 3

A hydrophobic plate was prepared by the same procedure as in example 1 except that polytetrafluoroethylene (PTFE) was used as a fluoro-based resin instead of a copolymer of tetrafluoroethylene and hexafluoropropylene.

Comparative Example 1

A plate was dipped into a dispersion having 5 wt % of neoflon (tetrafluoroethylene-hexafluoropropylene copolymer) in the form of a particle for 5 seconds to coat so as to obtain 0.5 mg/cm$^2$ of dispersion solution to be coated on the plate. Thereafter, the plate was dried in an oven at 60° C. In order to control the thickness of the plate, calendering of the dried plate was carried out using a roller to prepare a hydrophobic plate.

Comparative Example 2

A plate was prepared by the same procedure as in comparative example 1 except that PTFE was used as a fluoro-based resin instead of neoflon.

After preparing the cells having 4/5A, 1800 mAh of standard capacity by using the hydrophobic plates obtained according to the above examples and comparative examples, internal pressure according to the capacity rate of the cells was determined and the results thereof is shown in graphs a to e, respectively. Graph a shows internal pressure according to charge rate of a cell prepared by example 1 of this invention using a composition for an anode of a nickel-hydrogen cell. Graph b shows internal pressure according to charge rate of a cell prepared by example 2 of this invention using a composition for an anode of a nickel-hydrogen cell. Graph c shows internal pressure according to charge rate of a cell prepared by example 3 of this invention using a composition for an anode of a nickel-hydrogen cell. Graph d shows internal pressure according to charge rate of a cell prepared by comparative example 1. Graph e shows internal pressure according to charge rate of a cell prepared by comparative example 2.

Further, the thickness of the hydrophobic layer of the hydrophobic plates prepared according to the above examples and comparative examples, were determined, and the results thereof is shown in the following Table 1. Moreover, the cylindrical cells having 4/5A, 1800 mAh of capacity were prepared using the above hydrophobic plates. Peak internal pressure, internal resistance and lifetime of the cells at 1C rate and 150% charge, were determined and the results thereof is shown in the following Table 1. The lifetime of the cells is the number of charge-discharge cycles at which efficiency of the cells decrease by 90% of capacity of cell.

| | Thickness of hydrophobic layer on the surface of a anode [μm] | Peak internal pressure [atmosphere] | Internal resistance [m Ω] | Lifetime of the cells [cycle] |
| --- | --- | --- | --- | --- |
| Example 1 | 10 | 5 | 15 | 500 |
| Example 2 | 0.2 | 5 | 12 | 500 |
| Example 3 | 10 | 10 | 20 | 400 |
| Comparative example 1 | 20 | 7 | 20 | 400 |
| Comparative example 2 | 20 | 15 | 25 | 350 |

The method of the present invention can uniformly give a hydrophobic property over all the anode plate by using the hydrophobic composition, including an amorphous fluoro-based resin, as a hydrophobic resin to give a hydrophobic property to the plate and perfluorocarbon as a solvent. Accordingly, it is possible to thinly apply the diffusion layer of reactive material onto anode active material so as to readily decompose oxygen.

Perfluorocarbon solvent used as a solvent in this invention is a stable material which is not related to cell reaction, and the boiling point thereof is dependent upon the number of carbon atoms and fluorine atoms. Therefore, the solvent is well dried after coating so that an additional drying step is not required in preparing a hydrophobic plate.

Further, surface tension of the solvent is remarkably low, that is 10 dyne/cm, so that the solvent has a good fluidity, thereby allowing the coating thickness of the hydrophobic resin to be thinned. In addition, since amorphous fluro-based resin is used, fluoro-based resin can be coated in the form of a film on the plate so that the thickness of the coatings on the surface of the plate can be obtained at or less than 0.2 μm. Therefore, the amount of the resin to be coated per unit area can be decreased to one twentieth of the amount of resin conventionally used, the internal pressure is also decreased more effectively than that obtained by using the conventional composition. Therefore, the method of this invention can very thinly and uniformly coat fluorine atoms which is capable of decreasing the internal pressure of cell on the surface of the anode.

Further, when a cell is prepared by using the plate of this invention, electrolyte can be uniformly distributed through the anode during a charge-discharge cycle, thereby preventing the exhaust of electrolyte of the anode.

The method of preparing a hydrophobic plate of the present invention can be applied to a method of preparing plates for various fields, such as a condenser as well as a cell in preparing a plate with the object of increasing contact area of a gas.

Moreover, the method of the present invention is also useful for giving a hydrophobic property to certain objects as well as anode plate for cell.

In this disclosure, there is shown and described only the preferred embodiment of the invention, but, as aforementioned, it is to be understood that the invention is capable of use in various other combination and environments and is capable of changes or modification within the scope of the inventive concepts as expressed herein.

What is claimed is:

1. A negative electrode for a nickel-hydrogen battery comprising:
   a substrate; and
   a hydrophobic composition coated on the substrate, the hydrophobic composition including a hydrophobic resin for a solute and a perhalogenated hydrocarbon solvent.

2. The negative electrode as claimed in claim 1, wherein the perhalogenated hydrocarbon is selected from the group consisting of $C_3F_8$, $C_4F_{10}$, $C_5F_{12}$, $C_5F_{11}NO$, $C_6F_{14}$, $C_7F_{16}$, $C_8F_{18}$, $CCl_3F$, $CCl_2F_2$, $C_2F_3Cl_3$, $C_2Cl_3F_3$ and $C_2ClF_5$.

3. The negative electrode as claimed in claim 2, wherein the perhalogenated hydrocarbon is selected from the group consisting of $C_6F_{14}$, $C_7F_{16}$ and $C_8F_{18}$.

4. The negative electrode as claimed in claim 1, wherein the hydrophobic resin is a fluoro-based resin.

5. The negative electrode as claimed in claim 1, wherein the hydrophobic resin has an amorphous form.

6. The negative electrode as claimed in claim 4 wherein the fluoro-based resin is a copolymer of tetrafluoroethylene and hexafluoropropylene and/or polytetrafluoroethylene.

7. The negative electrode as claimed in claim 1 wherein an amount of the hydrophobic resin present in the composition is 0.01 to 5 wt % based on the weight of perhalogenated hydrocarbon solvent.

8. The hydrophobic composition as claimed in claim 1 wherein a surface energy of the hydrophobic resin is 10 to 20 dyne/cm.

9. A method of preparing a hydrophobic plate comprising the step of:
   coating a plate with a hydrophobic composition including a hydrophobic resin dispersed in a perhalogenated hydrocarbon solvent.

10. The method of preparing a hydrophobic plate as claimed in claim 9 wherein the perhalogenated hydrocarbon solvent is selected from the group consisting of $C_3F_8$, $C_4F_{10}$, $C_5F_{12}$, $C_5F_{11}NO$, $C_6F_{14}$, $C_7F_{16}$, $C_8F_{18}$, $CCl_3F$, $CCl_2F_2$, $C_2F_3Cl_3$, $C_2Cl_3F_3$ and $C_2ClF_5$.

11. The method of preparing a hydrophobic plate as claimed in claim 10 wherein the perhalogenated hydrocarbon is selected from the group consisting of $C_6F_{14}$, $C_7F_{16}$ and $C_8F_{18}$.

12. The method of preparing a hydrophobic plate as claimed in claim 9 wherein the hydrophobic resin is a fluoro-based resin.

13. The method of preparing a hydrophobic plate as claimed in claim 9 wherein the hydrophobic resin has an amorphous form.

14. The method of preparing a hydrophobic plate as claimed in claim 12 wherein the fluoro-based resin is selected from the group consisting of a copolymer of tetrafluoroethylene and haxafluoropropylene and/or polytetrafluoroethylene.

15. The method of preparing a hydrophobic plate as claimed in claim 9 wherein the amount of hydrophobic resin present in the composition is 0.01 to 5 wt % based on the weight of the perhalogenated hydrocarbon solvent.

16. The method of preparing a hydrophobic plate as claimed in 9 wherein the step of coating is carried out by dipping the plate into the hydrophobic composition, or spraying the hydrophobic composition on the plate.

17. The method of preparing a hydrophobic plate as claimed in claim 9 wherein the step of coating is maintained until $0.005<x<0.8$ mg/cm$^2$ of the hydrophobic resin is coated on the plate.

18. The method of preparing a hydrophobic plate as claimed in claim 9 wherein a surface energy of the hydrophobic resin is 10 to 20 dyne/cm.

19. A negative electrode for a nickel-hydrogen battery comprising:

a substrate; and a hydrophobic composition coated on the substrate, the hydrophobic composition including a hydrophobic resin dispersed in a solvent selected from the group consisting of $C_3F_8$, $C_4F_{10}$, $C_5F_{12}$, $C_6F_{14}$, $C_7F_{16}$, $C_8F_{18}$, $CCl_3F$, $CCl_2F_2$, $C_2F_3Cl_3$, $C_2Cl_3F_3$ and $C_2ClF_5$.

20. The hydrophobic composition as claimed in claim 19, wherein the perhalogenated hydrocarbon is selected from the group consisting of $C_3F_8$, $C_4F_{10}$, $C_5F_{12}$, $C_6F_{14}$, $C_7F_{16}$, $C_8F_{18}$, $CCl_3F$, $CCl_2F_2$, $C_2F_3Cl_3$, $C_2Cl_3F_3$ and $C_2ClF_5$.

* * * * *